UNITED STATES PATENT OFFICE.

THOMAS JOHN O'SULLIVAN, OF LONDON, CANADA, ASSIGNOR TO HELENA AMELIA O'SULLIVAN, OF SAME PLACE.

PROCESS OF MAKING PIGMENTS.

SPECIFICATION forming part of Letters Patent No. 629,268, dated July 18, 1899.

Application filed March 10, 1899. Serial No. 708,551. (No specimens.)

*To all whom it may concern:*

Be it known that I, THOMAS JOHN O'SULLIVAN, a subject of the Queen of Great Britain, residing at the city of London, in the county of Middlesex and Province of Ontario, Dominion of Canada, have invented a new and useful Process for Making Pigments, of which the following is a specification.

My invention is in the nature of a new process for making dry pigment, which is designed to be afterward mixed with oil to form a paint.

It consists in saturating sawdust with a solution of a salt of iron and then drying and burning it, the residuum forming the pigment.

For the salt of iron I may use nitrate of iron, muriate of iron, sulfate of iron, phosphate of iron, or any other product obtained by treating iron with an acid. The solution may vary widely in strength; but I find a solution of six to fifty-five per cent. of the iron salt is best adapted to my uses.

To make the paint, I take a definite quantity of wood sawdust and saturate it with a solution of the iron salt. The strength of the solution determines the different shades of paint, the less iron salt to a given quantity of sawdust the darker will be the resulting pigment, and vice versa. After the sawdust has been saturated with the solution it is dried and burned in direct contact with the air. For this purpose it is only necessary to place it in a wire basket, start a fire beneath it to dry out the moisture, and start the ignition, and then the ignition of the sawdust and conversion into the pigment proceeds spontaneously after being started—*i. e.*, the burning of the sawdust furnishes its own heat for the operation—and the residuum left is the marketable pigment. The chemical changes which take place are the expulsion of water from the sawdust and partial burning of the carbon and a decomposition of the iron salt and its conversion into a red oxid of iron mixed with the ash of the cellulose and more or less unconsumed carbon. The physical aspect of the burned product is a powder or friable mass of a color varying from light red to dark brown, which forms a pigment which when mixed with oil forms a very cheap and durable paint.

This pigment is very cheaply made, as the sawdust is practically a waste material and in burning furnishes the necessary heat to complete the operation after being dried out.

What I claim as the invention, and desire to secure by Letters Patent, is—

The process of producing a pigment which consists in saturating sawdust with a salt of iron and then drying and burning it substantially as shown and described.

THOMAS JOHN O'SULLIVAN.

Witnesses:
M. P. McDONAGH,
THOS. COLERIDGE.